United States Patent [19]
Darbon et al.

[11] Patent Number: 5,337,380
[45] Date of Patent: Aug. 9, 1994

[54] METHOD OF LIMITING COUPLING LOSSES BETWEEN MONOMODE OPTICAL FIBERS USING A PIECE OF MULTIMODE OPTICAL FIBER

[75] Inventors: Philippe Darbon; Emmanuel Grard, both of Saint Michel sur Orge, France

[73] Assignee: Alcatel N.V., Amsterdam, Netherlands

[21] Appl. No.: 945,148

[22] Filed: Sep. 15, 1992

[30] Foreign Application Priority Data

Sep. 16, 1991 [FR] France ............... 91 11364

[51] Int. Cl.⁵ .................. G02B 6/26; C03B 23/20
[52] U.S. Cl. .................................. 385/28; 385/31; 385/43; 385/95; 385/96; 65/407; 65/403
[58] Field of Search ................. 385/28, 29, 33, 34, 385/30, 31, 38, 43, 95, 96, 97, 98, 88; 65/1, 2, 3.11, 4.1, 4.2, 36; 250/227.11

[56] References Cited

U.S. PATENT DOCUMENTS

| | | | |
|---|---|---|---|
| 4,701,011 | 10/1987 | Emkey et al. | 385/34 X |
| 4,721,353 | 1/1988 | Khoe et al. | 385/43 X |
| 4,728,170 | 3/1988 | Robertson | 385/140 X |
| 4,737,004 | 4/1988 | Amitay et al. | 385/43 X |
| 4,804,248 | 2/1989 | Bhagavatula | 385/28 X |
| 4,900,114 | 2/1990 | Mortimore et al. | 385/96 X |
| 4,962,988 | 10/1990 | Swann | 385/34 X |
| 4,991,926 | 2/1991 | Pavlath | 385/43 X |
| 4,997,248 | 3/1991 | Stowe | 385/43 X |
| 5,074,633 | 12/1991 | Cohen et al. | 385/43 |
| 5,142,603 | 8/1992 | Forrester | 385/96 X |
| 5,278,926 | 1/1994 | Doussiere | 385/28 |

FOREIGN PATENT DOCUMENTS

| | | | |
|---|---|---|---|
| 0155379 | 9/1985 | European Pat. Off. | 385/31 X |
| 0340042 | 11/1989 | European Pat. Off. | 385/31 X |
| 2394102 | 5/1979 | France | 385/31 X |
| 1-314210 | 12/1989 | Japan | 385/43 X |
| 2169096 | 7/1986 | United Kingdom | 385/43 X |
| 2175411 | 11/1986 | United Kingdom | 385/31 X |
| 2183866 | 6/1987 | United Kingdom | 385/43 X |

OTHER PUBLICATIONS

Patent Abstracts of Japan, vol. 7, No. 282 (P-243)(1427) Dec. 16, 1983 & JP-A-58 158 620 (Hitachi) (Matsumoto).

Primary Examiner—Brian Healy
Attorney, Agent, or Firm—Sughrue, Mion, Zinn, Macpeak & Seas

[57] ABSTRACT

The present invention relates to a method of limiting coupling losses between a monomode optical fiber (2) having a mode diameter of $W_o$, and an optical system (1) having a mode diameter $W'_o$ that is different from $W_o$, said method being characterized by the fact that a piece (4) of multimode fiber is welded onto the end of said monomode fiber, said piece of multimode fiber having a length in the range 0.1 mm to 5 mm, and having the same cladding outside diameter as said monomode fiber, a mode diameter substantially equal to $W'_o$, and an index difference $\delta n$ lying in the range $5 \times 10^{-3}$ to $50 \times 10^{-3}$, the weld creating an adiabatic cone in the region where the cores meet.

5 Claims, 1 Drawing Sheet

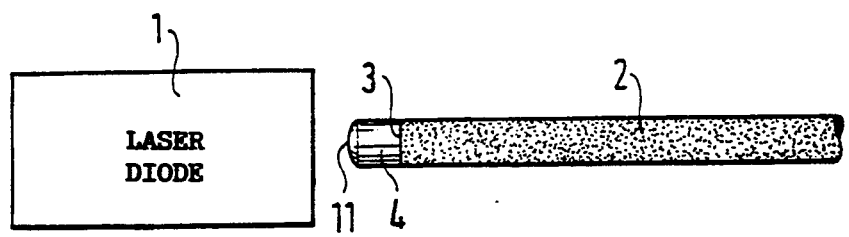
FIG. 1
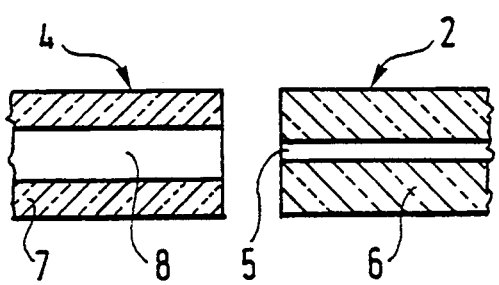
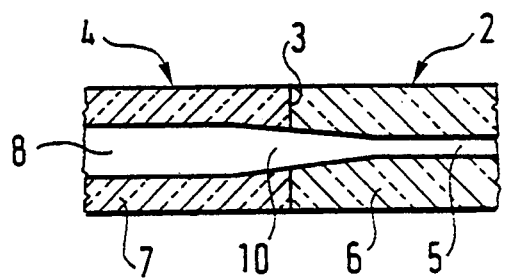
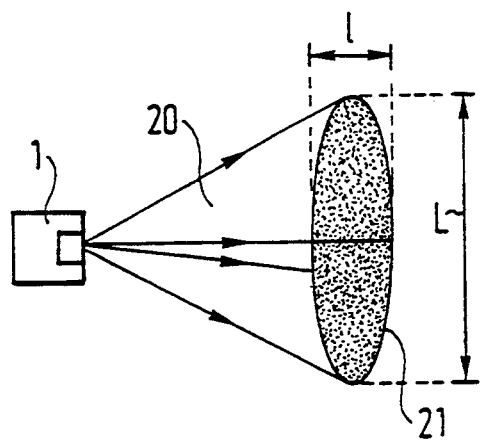
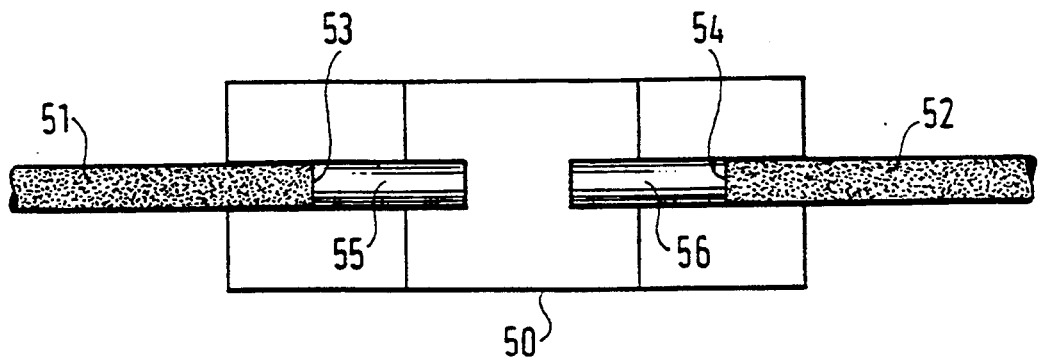

METHOD OF LIMITING COUPLING LOSSES BETWEEN MONOMODE OPTICAL FIBERS USING A PIECE OF MULTIMODE OPTICAL FIBER

BACKGROUND OF THE INVENTION

The present invention relates to a method of limiting coupling losses between a monomode optical fiber having a mode diameter of $W_o$, and an optical system having a mode diameter $W'_o$ that is different from $W_o$.

It is recalled that the mode radius $W_o$ of an optical fiber may be defined as follows:

$$\frac{W_o}{a} = 0.65 + \frac{1.619}{\sqrt[3]{V}} + \frac{2.879}{V^6}$$

where:

$$V = \frac{2\pi a}{\lambda} \sqrt{2n\delta n} \text{ (standardized frequency)}$$

$a$ = core radius $$n = \frac{n_{core} + n_{cladding}}{2}$$

$\delta n = n_{core} - n_{cladding}$

Typically, a monomode optical fiber has a core diameter in the range about 8 μm to about 10 μm, and a cladding outside diameter of about 125 μm. The index difference $\delta n$ can lie in the range $5 \times 10^{-3}$ to $50 \times 10^{-3}$. The usual value lies in the range $5 \times 10^{-3}$ to $16 \times 10^{-3}$.

It is extremely difficult to couple such a fiber, and in particular to couple it to a laser diode. In order to achieve optimum coupling, two conditions must be met:

an optical surface having a radius of curvature that is extremely small and therefore very difficult to achieve must be provided at the end of the fiber; and said optical surface must be disposed almost touching the diode, and this is mechanically impossible.

Currently, the coupling percentage does not exceed 45% to 50%.

The problem is to create means for providing a better coupling percentage in spite of a distance that is mechanically acceptable being maintained between the diode and the fiber, and tolerances that are feasible being maintained for the angular position of the fiber relative to the diode.

SUMMARY OF THE INVENTION

The present invention provides a method of limiting coupling losses between a monomode optical fiber having a mode diameter of $W_o$, and an optical system having a mode diameter $W'_o$ that is different from $W_o$, said method being characterized by the fact that a piece of multimode fiber is welded onto the end of said monomode fiber, said piece of multimode fiber having a length in the range 0.1 mm to 5 mm, and having the same cladding outside diameter as said monomode fiber a mode diameter substantially equal to $W'_o$ and an index difference $\delta n$ lying in the range $5 \times 10^{-3}$ to $50 \times 10^{-3}$, the weld creating an adiabatic cone in the region where the cores meet.

For the purposes of assembly, it is extremely advantageous for the piece of multimode fiber to have the same cladding outside diameter as the monomode fiber.

In practice, the splice welded between the piece of fiber and the fiber causes a loss of less than 0.5 dB. This can be explained by the fact that, under the action of heat, an interdiffusion phenomenon occurs at the splice, the doping elements contained in the cores of the two fibers in question being interdiffused both radially and longitudinally. Very surprisingly, this results in the two corresponding mode diameters being locally modified and matched together.

By using said piece of multimode fiber, it is easier to match the beam from the laser diode with the monomode fiber. The laser-to-fiber coupling distance is significantly greater than in the prior disposition: it can be multiplied by two or three, and the resulting coupling percentage can thus be increased from 45% to 70%. Angular tolerance does not constitute a parameter that is difficult to control.

In order to optimize coupling further and to take account of the fact that the cross-section of the laser beam from the diode is slightly elliptical, it may be advantageous to choose said piece of fiber to have a core that is elliptical at its end situated nearer the laser diode. Such a characteristic can be obtained by local heat treatment along predetermined generator lines of said piece of fiber.

In a particularly advantageous use, the method of the invention makes it possible to improve coupling between two analogous monomode fibers connected together in a connector. For this purpose, a piece of fiber is welded to the end of each of the monomode fibers, as described above, so as to multiply their mode diameters by two or three while keeping the same cladding outside diameters. The pieces of multimode fiber are short enough for the monomode propagation inside the two fibers to be maintained constant in practice.

By performing such a method, it becomes considerably easier to align the two monomode fibers in the connector. Alignment tolerances are much less tight than for a conventional connector, and overall connection losses are reduced.

Other characteristics and advantages of the present invention will appear on reading the following description of embodiments given by way of non-limiting example and with reference to the accompanying drawing, in which:

BRIEF DESCRIPTION OF THE DRAWING

FIG. 1 is a very simplified diagram of coupling of the invention between a laser diode and a monomode fiber;

FIG. 2A is a fragmentary diagram in section of the FIG. 1 monomode fiber and piece of multimode fiber before the splice is welded;

FIG. 2 is analogous to FIG. 2A, but after the splice has been welded;

FIG. 3 is a diagram showing a laser beam with an elliptical cross-section; and

FIG. 4 is a simplified diagram showing how the method of the invention is used to connect two monomode fibers by means of a connector.

DESCRIPTION OF PREFERRED EMBODIMENTS

FIG. 1 shows a laser diode 1 whose beam is to be coupled to a monomode fiber 2 as efficiently as possible.

By way of example, the wavelength used is about 1.3 μm or about 1.5 μm.

The mode diameter of the laser diode 1 is about one micrometer.

The fiber 2 has the following characteristics:

| | |
|---|---|
| core diameter: | 8 μm; |
| mode diameter $W_o$: | 9.5 μm; |
| cladding outside diameter: | 125 μm; |
| δn: | $5 \times 10^{-3}$. |

In the invention, a piece of multimode fiber 4 having the following characteristics is welded to the end of the fiber 2:

| | |
|---|---|
| core diameter: | 50 μm; |
| length: | 0.15 mm; |
| cladding outside diameter: | 125 μm; |
| core index: | 1.4638; |
| cladding index: | 1.4468; |
| δn: | $17 \times 10^{-3}$. |

The welded splice is referenced 3. FIGS. 2A and 2B show the fiber 2 with its cladding 6 and its core 5, and the piece of fiber 4 with its cladding 7 and its core 8, before and after welding. While the splice 3 is being welded, adiabatic interdiffusion of the doping agents in the cores 5 and 8 occurs in the region 10.

The heating causes the core 5 to increase in size to form an adiabatic cone having dimensions such that the fiber 2 retains its monomode properties. In the same way, the length chosen for the piece 4 also enables the monomode properties to be retained.

The end face 11 of the piece of fiber 4 is in the shape of a convex spherical optical surface having a radius of curvature of not less than 30 μm. Such an optical surface can be made by using various known methods such as laser machining, mechanical machining, or chemical etching. The mode diameter $W'_o$ of the piece of fiber 4 is then analogous to the mode diameter of the laser diode 1.

The distance maintained between the diode 1 and the face 11 is about 23 μm. The tolerances along an x-axis and along a y-axis in a plane perpendicular to the overall optical axis are about one micron each.

The method of the invention makes it possible to increase coupling between the diode 1 and the fiber 2 from 45% to 70% with adjustment conditions that do not pose any significant mechanical problems.

In FIG. 3, the FIG. 1 disposition is further optimized by taking account of the fact that the beam 20 from the diode i has an elliptical cross-section 21 (having dimensions L and l), with a mode radius $W'_o$ that varies in the same way.

While that end of the piece of fiber which is situated closer to the fiber 2 is cylindrically symmetrical about the optical axis of the overall system, as in the FIG. 1 embodiment, the cross-section of that end which is situated closer to the diode 1 shows outwardly-circular cladding that is 125 μm in diameter, and an elliptical core having a cross-section that is analogous to the cross-section 21 of the beam 20.

FIG. 4 shows an extremely advantageous use of the method of the invention. Two monomode fibers 51 & 52 which are analogous to the fiber 2 in the preceding embodiments are connected together by means of a connector represented diagrammatically by the box 50. The alignment of the two fibers is very critical given the very small size of their cores. Losses are essentially caused by axial misalignment, by inclination, and by the gap between them.

In the invention, respective pieces of fiber 55 & 56 are welded at 53 and 54, which pieces are analogous to the piece 4 in embodiment i but without their end faces being machined to form convex optical surfaces. Because of the adiabatic cone shape of the cores in the splices, and because of the shortness of the pieces 55 & 56, there is no mode mismatch at the connector 50. The losses caused by the splices are only about 0.2 dB. Moreover, because of the value $W'_o$ of the two pieces of fiber 55 & 56 alignment is much easier, and the coupling percentage is much improved.

A theoretical coupling percentage of 98% can thus be easily obtained.

Naturally, the invention is not limited to the two embodiments described above. Any means may be replaced by equivalent means without going beyond the ambit of the invention.

What is claimed is:

1. A method of limiting coupling losses between a monomode optical fiber, having a core and a cladding and having a mode diameter of $W_o$, and an optical system having a mode diameter $W'_o$ that is different from $W_O$, said method comprising welding by heating a piece (4) of multimode fiber, also having a core and a cladding, onto an end of said monomode fiber (2); said piece (4) of multimode fiber having a length in the range 0.1 mm to 5 mm, the same cladding outside diameter as said monomode fiber (2), a mode diameter substantially equal to $W'_o$, and an index difference δn lying in the range $5 \times 10^{-3}$ to $50 \times 10^{-3}$, such that the heating during welding causes the core of said monomode optical fiber to increase in size by longitudinal and radial interdiffusion of doping elements contained in said cores so as to form an adiabatic cone in the region (10) where said cores meet.

2. The method according to claim 1, wherein said optical system is a laser diode (1) suitable for emitting a beam (21) having a substantially elliptical cross-section, and further comprising treating an end of said piece of multimode fiber that is adjacent to aid diode so that its core has an elliptical cross-section which is analogous to that of said beam.

3. The method according to claim 1, wherein said optical system is a laser diode, and further comprising selecting an end face (11) of said piece (4) of multimode fiber that is adjacent to said diode to be in the shape of a convex spherical optical surface having a radius of curvature of not less than 30 μm.

4. A method for connecting two monomode optical fibers (51, 52) together via a connector (50), said method comprising welding, by heating, respective one of two pieces (55, 56) of multimode fiber onto an end of each of said monomode fibers, said pieces of multimode fiber having a cladding outside diameter that is the same as that of said monomode fibers; wherein the heating during the welding causes a core of each of said monomode optical fibers to increase in size by longitudinal and radial interdiffusion of doping elements contained in said core so as to form an adiabatic cone in a region where said core of each of said monomode fibers meets a core of said piece of multimode fibers.

5. The method according to claim 4, wherein said monomode optical fibers have a mode diameter $W_o$ and said pieces of multimode fibers have a mode diameter $W'_o$, and further comprising selecting said mode diameter $W'_o$ to be substantially equal to two or three times said mode diameter $W_o$.

* * * * *